United States Patent
Barker et al.

(10) Patent No.: US 8,186,518 B2
(45) Date of Patent: *May 29, 2012

(54) SELF POWERED WATER PURIFICATION SYSTEM

(76) Inventors: Jack E. Barker, Evergreen, CO (US); Carmen L. Barker, Evergreen, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,338

(22) Filed: Aug. 16, 2010

(65) Prior Publication Data

US 2011/0147284 A1    Jun. 23, 2011

Related U.S. Application Data

(63) Continuation of application No. 12/032,914, filed on Feb. 18, 2008, now Pat. No. 7,775,374.

(60) Provisional application No. 60/988,329, filed on Nov. 15, 2007.

(51) Int. Cl.
*B01D 27/00* (2006.01)
*B01D 29/56* (2006.01)
*C02F 1/00* (2006.01)

(52) U.S. Cl. ............ 210/416.3; 210/203; 210/259; 210/321.6

(58) Field of Classification Search ........... 210/202, 210/203, 232, 252, 259, 321.6, 416.1, 416.3
See application file for complete search history.

(56) References Cited

U.S. PATENT DOCUMENTS

| | | | |
|---|---|---|---|
| 4,110,219 A | 8/1978 | Maples | |
| 4,199,448 A | 4/1980 | Johnson et al. | |
| 4,609,466 A | 9/1986 | McCausland et al. | |
| 4,623,467 A | 11/1986 | Hamlin | |
| 4,636,307 A | 1/1987 | Inoue et al. | |
| 4,670,144 A | 6/1987 | McCausland et al. | |
| 4,844,805 A | 7/1989 | Solomon | |
| 4,863,596 A | 9/1989 | O'Callaghan et al. | |
| 4,917,847 A | 4/1990 | Solomon | |
| 4,975,185 A | 12/1990 | Taylor | |
| 5,004,535 A | 4/1991 | Bosko et al. | |
| 5,147,532 A | 9/1992 | Leek, Jr. | |
| 5,296,148 A | 3/1994 | Colangelo et al. | |
| 5,312,547 A | 5/1994 | Kruger et al. | |
| 5,346,592 A | 9/1994 | Madani | |
| 5,348,651 A | 9/1994 | Carlson et al. | |
| 5,352,364 A | 10/1994 | Kruger et al. | |
| 5,356,531 A | 10/1994 | Rantz | |
| 5,435,909 A | 7/1995 | Burrows | |
| 5,445,729 A * | 8/1995 | Monroe et al. | ............ 210/86 |
| 5,496,466 A | 3/1996 | Gray | |
| 5,498,338 A | 3/1996 | Kruger et al. | |
| 5,510,027 A | 4/1996 | Tejeda | |
| 5,527,450 A | 6/1996 | Burrows | |

(Continued)

OTHER PUBLICATIONS http://www.trunz.ch/TWS-100.347.0.html?&L=1.

(Continued)

*Primary Examiner* — Fred Prince (74) *Attorney, Agent, or Firm* — Holland & Hart LLP (57) ABSTRACT

A water purification unit to purify potentially contaminated water is provided. The water purification unit is in fluid communication with a water source and has a pump to draw water from the water source. The water is passed through at least a main filter to purify the water and dispensed through an outlet. Power is provided to the water purification unit by a battery bank and a non-grid power source.

19 Claims, 5 Drawing Sheets

U.S. PATENT DOCUMENTS

| | | |
|---|---|---|
| 5,580,444 A | 12/1996 | Burrows |
| 5,589,066 A | 12/1996 | Gray |
| 5,595,662 A | 1/1997 | Sanderson |
| 5,632,892 A | 5/1997 | Klein |
| 5,685,980 A | 11/1997 | Patapoff et al. |
| 5,741,416 A | 4/1998 | Tempest, Jr. |
| 5,787,537 A | 8/1998 | Mannillo |
| 5,817,231 A | 10/1998 | Souza |
| 5,951,863 A | 9/1999 | Kruger et al. |
| 5,972,216 A | 10/1999 | Acernese et al. |
| 6,016,820 A | 1/2000 | Knoll et al. |
| 6,099,735 A | 8/2000 | Kelada |
| 6,296,756 B1 | 10/2001 | Hough et al. |
| 6,558,537 B1 * | 5/2003 | Herrington et al. ........... 210/192 |
| 6,733,669 B1 | 5/2004 | Crick |
| 6,824,695 B2 | 11/2004 | Tempest, Jr. |
| 7,208,089 B2 | 4/2007 | Montemagno et al. |
| 7,374,655 B2 | 5/2008 | Roberts et al. |
| 7,427,409 B2 | 9/2008 | Gooch et al. |
| 7,438,801 B2 | 10/2008 | Scaringe |
| 7,470,366 B2 | 12/2008 | Queen et al. |

OTHER PUBLICATIONS http://www.trunz.ch/TSS-100.351.0.html?&L=1.

* cited by examiner

SELF POWERED WATER PURIFICATION SYSTEM

CLAIM OF PRIORITY UNDER 35 U.S.C. §119

The present application is a Continuation of U.S. application Ser. No. 12/032,914 filed Feb. 18, 2008, now U.S. Pat. No. 7,775,374, which claims priority to Provisional Application No. 60/988,329 entitled "SELF POWERED WATER PURIFICATION SYSTEM" filed Nov. 15, 2007, both of which are hereby expressly incorporated by reference herein.

BACKGROUND

1. Field

The technology of the present application relates to water purification, and more specifically to water purification systems that are portable, self-powered, of a combination thereof.

2. Background

Water is a necessity of life. Unfortunately many areas around the world do not have access to clean, healthy, drinkable water.

Rural, remote, and non-developed locations frequently do not have ready access to municipal water sources or even portable water sources. Such locations include many third world countries, wilderness locations, and the like. These water sources themselves are typically contaminated. Moreover, the water sources are frequently shared with livestock, other animals, and the like In some cases, urban and more developed location also lack portable water sources. For example, during the aftermath of hurricane Katrina, large portions of Gulf Coast area did not have ready access to drinkable water. Similarly, drinkable water may not be readily available to fire fighters battling forest fires as forest fires are sometime is remote areas.

A water source, such as, for example, a pond, creek, river, lake, or the like frequently is located in relative proximity to where the water is needed. However, the water source is often contaminated with viral or bacterial agents. Conventional water treatment technology provides mechanisms that may treat the water source or water drawn from the source to provide decontaminated water, but conventional water treatment technology requires some type of power to run the various components of the treatment technology. In non-developed locations and post catastrophic events, frequently no power source exists making water treatment nearly impossible. Other basic infrastructure, such as fuel, chemical agents, piping, storage, or the like, to operate water treatment plants frequently are missing as well and, at best, are unreliable.

Thus, there is a need in the world to provide a cost efficient water purification system that can be self powered or remotely located to provide drinkable water from a water source regardless of the level of contamination in the water source.

SUMMARY

Embodiments disclosed herein address the above stated needs by providing a water purification unit. The water purification unit includes a fluid inlet adapted to be in fluid communication with a water source. A fluid pump in fluid communication with the fluid inlet draws water from the water source to the water purification unit. At least a main filter in fluid communication with the fluid pump and fluid inlet adapted to filtrate the water from the water source and provide filtered (or purified) water to an outlet, such as a faucet. A controller controls the operation of the water purification unit and a power system provides electrical power to the controller to control electrical components and the pump motor. The power system includes a battery and a non-grid power source.

A water purification system also is provided. The water purification system includes a water source, water source, an inlet pipe, a housing for a water purification unit and the water purification unit. The water purification unit includes a fluid inlet coupled to the inlet pipe and in fluid communication with the water source and a fluid pump that draws water from the water source to the water purification unit. The water purification unit has a course and fine particulate filter to remove particulate, bacteria, and viruses. An outlet isolation valve is in fluid communicating with the fluid inlet, the fluid pump, the course particular filter, and the fine particulate filter and adapted to provide filtered water when opened. A controller is connected to the water purification unit and a power system is provided to provide electrical power. The power system includes a battery and a non-grid power source.

The technology of the present invention also relates to a water purification unit that has a fluid inlet adapted to be in fluid communication with a water source and a means for drawing fluid from the water source through the water purification unit. The water is passed through a means for purifying the water and dispensed at a means for dispensing the purified water. The water purification unit is provided electrical power by a non-grid means for providing electrical power.

DETAILED DESCRIPTION

The technology of the present application will now be explained with reference to the figures briefly described above. While the technology of the present application will be explained with regard to a particular form of water treatment, one of skill in the art will now recognize on reading the disclosure that other types of water treatment are possible. Moreover, the technology of the present application will be explained with regarding to a particular orientation and power source. One of skill in the art will now recognize on reading this disclosure that other orientations and power sources are possible. Additional, alternative, and other possible examples will be provided, but the inclusion of an example or the lack of additional examples should not be construed to limit the technology of the present application. Additional the technology of the present application will be described with reference to certain exemplary embodiments. The word "exemplary" is used herein to mean "serving as an example, instance, or illustration." Any embodiment described herein as "exemplary" is not necessarily to be construed as preferred or advantageous over other embodiments. An embodiment described herein should be considered exemplary unless specifically indicated to the contrary.

Figure 1:
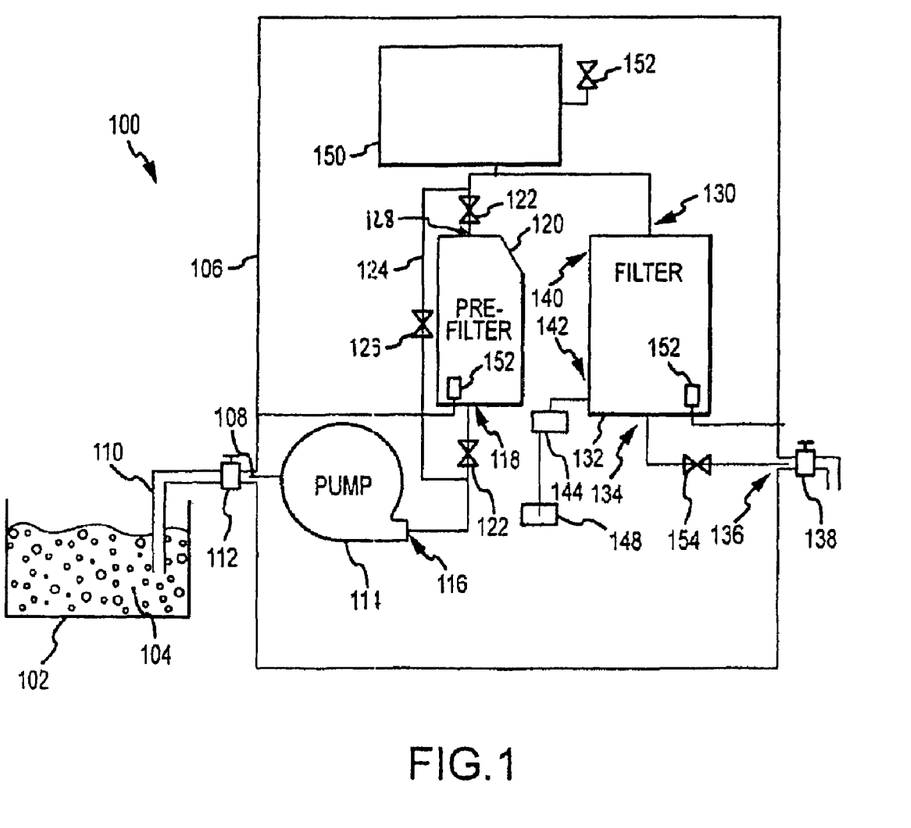
FIG. 1 is a functional block diagram of a water purification system in accordance with technology of the present application.

Referring first to FIG. 1, a fluid schematic view of an exemplary water purification system 100 consistent with technology of the present application is provided. Water purification system 100 is connected to a water source 102. Water source 102 may be contaminated with viral, bacterial, or other unsafe agents 104. As shown, water source 102 is an open water source, such as, for example, a lake, a pond, a stream, a creek, a river, a well, or the like, mostly as a matter of what is available. Notice, water source 102 could be, as desired, a municipal water source especially if the municipal water source is not a clean or healthy water source. Water purification unit 106 is located proximate water source 102 and is a fluid inlet 108 on water purification unit 106 is in fluid communication with water source 102 via a pipe 110. Pipe 110 should be interpreted generically to include copper tubing, PVC tubing, rubber tubing, or the like. Optionally, an inlet isolation valve 112 may be provided to disconnect water purification unit 106 from water source 102. Fluid inlet 108 is connected to a fluid pump 114. Depending on the location and type of water source 102 and the relative proximity of water purification unit 106, fluid pump 114 may be a centrifugal pump, a positive displacement pump, a reciprocal pump, or the like. For example, if water source 102 is, for example, a stream, and water purification unit 106 is located on the bank of the stream, a low pressure centrifugal pump may be adequate. Whereas if water source 102 is a relatively deep well, a positive displacement pump may be required to pump the fluid.

Optionally, pump 114 has a pump discharge 116 coupled to a prefilter inlet 118 of an optional prefilter 120. Prefilter 120 may be, for example, a course filter to remove larger particulate, bacteria, or viruses (generically particulate, bacteria, and viruses are collectively referred to as particulate). In one working embodiment, the prefilter is a conventional 20 micron filter although prefilters may range from relatively fine prefilters in the range of 5 to 20 microns to relatively course prefilters in the range of 50 to 100 microns, although prefilter size may filter anything from about 5 microns to about 100 microns. Prefilter 120 is shown with a pair of isolation valves 122 and a bypass line 126 having an isolation valve 124. The isolation valves 122, 124 and bypass line 126 allow prefilter 120 to be selectively removed from water purification unit 106 as necessary. Such as, for example, to replace a filter for regular maintenance or the like. Each fluid component of water purification system 100 may be isolated using a similar construction, which construction will not be shown on other components for simplicity.

A prefilter discharge 128 of prefilter 120 is coupled to a main filter inlet 130 of main filter 132. A main filter outlet 134 of main filter 132 is coupled to the water purification unit outlet 136 that is coupled to an outlet isolation valve 138, which may be and is generically referred to as a conventional spigot or faucet.

Main filter 132 may be a single filter 132 as shown or a series of filters $132_{1-n}$ to filter the water source. In one working embodiment, main filter 132 comprises a first section 140 comprising a carbon filter. The carbon filter provides, among other things, odor removal and the like. Main filter 132 also comprises a second section 142 comprising a membrane filter. The working embodiment membrane filter is a 2 micron filter identified as a Zenon Membrane filter available from General Electric, and more particularly the GE® HOMESPRING™ available from GE Water & Process Technologies. The 2 micron membrane filter is sized to eliminate bacterial and viral agents. The main filter could be a more or less course however in the range from just about 0.1 micron or less to about 5 microns. This main filter may sometimes be referred to fine particular filter 132. While one working embodiment provides a membrane and carbon main filter, other purification operations are possible together with the above or alternatively to the above. Other types of purification technologies include, for example, reverse osmosis, desalination, chemical reactants (such as chlorine for example), ultraviolet radiation, other types or irradiation, and other purification technologies as generally are known in the art. Some main filters may include add pump 144, such as an injection or charge pump, to add agents 146 from an agent source 148 to the water in main filter 132.

As currently shown, water purification unit is a pressurized unit such that opening faucet 138 results in pump 114 cycling on and closing faucet 138 results in pump 114 cycling off. To reduce the cycling of pump 114 (to minimize wear and tear), an expansion tank 150 may be provided. Expansion tank 150 is shown upstream from prefilter 120 and downstream from main filter 132, but expansion tank 150 may be contained elsewhere. Moreover, pump 114 may be placed at multiple locations throughout the fluid path, such as, for example, downstream from prefilter 120. Prefilter 120 and main filter 152 may contain conventional drains to allow flushing the system as a matter of design choice. Optionally, attached to expansion tank 150 is a relief valve 152 to inhibit over pressurization. Additionally and optionally, a flow rate valve 154 may be provided to control the minimum and/or maximum flow through water purification unit 106. Flow rate may depend, for example, on the capacities of the prefilter 120, main filter 132, and the pump 114.

Figure 2:
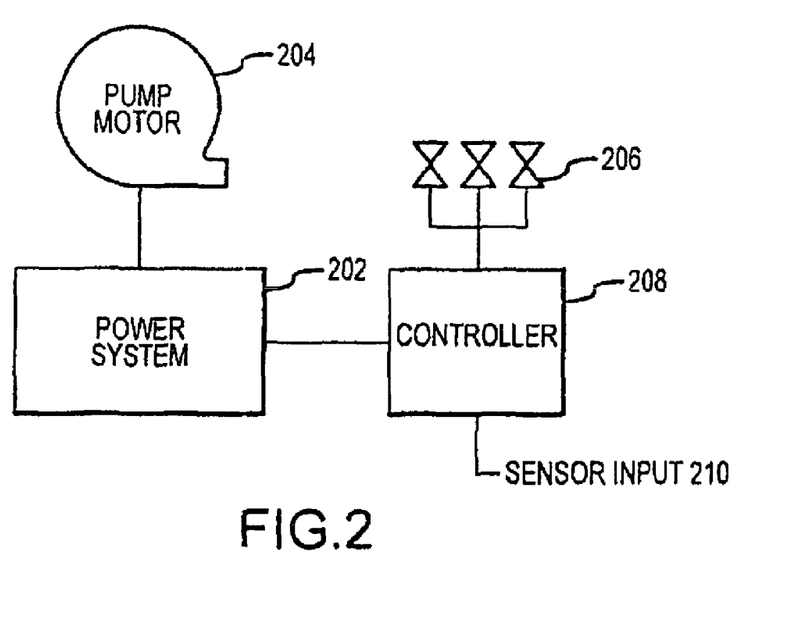
FIG. 2 is a functional block diagram of a water purification system in accordance with technology of the present application.
Figure 3:
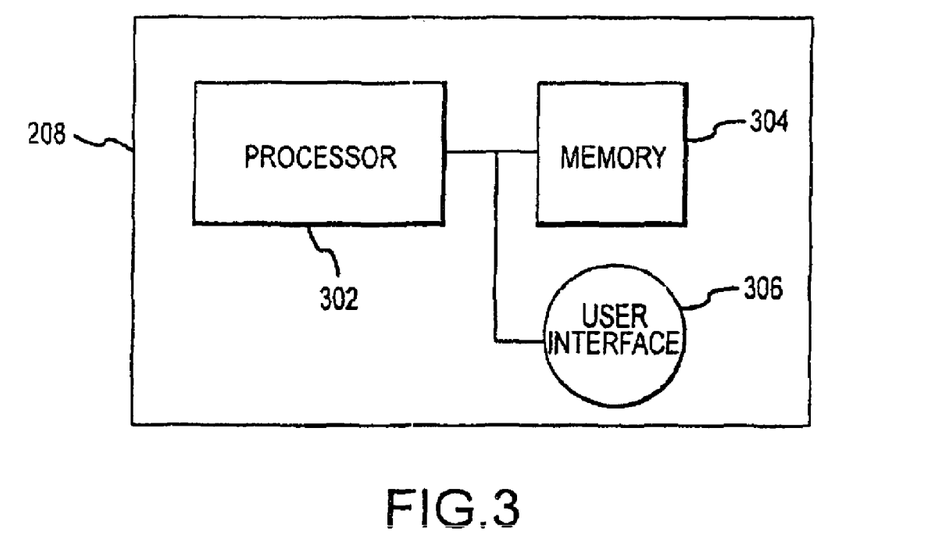
FIG. 3 is a is a functional block diagram of a controller of FIG. 2.

Referring now to FIG. 2, an electrical schematic diagram of water purification unit 106 is provided. Water purification unit 106 comprises a power system 202 to provide power to water purification unit 106. Power system 202 is electrically coupled to a pump motor 204 to run pump 114 and electrically coupled to solenoid valves 206. While the various valves described may be manually operated, such as, for example, spigot 138, certain valves may be electrically operated, such as isolation valves 122 and 124. Solenoid valves 206 may be coupled directly to power system 202 or through a controller 208. Controller 208, for example, may operate flow rate valve 154 to regulate flow through water purification unit 106. In this instance, controller 208 would receive a flow signal from a sensor, which is generically shown as sensor input 210. Drains 152 may also be provided as solenoid valves 206. As such, controller 208 may provide a means to cycle drains 152 to provide regular flushes of the filter. Referring now to FIG. 3, controller 208 is shown in more detail. Controller 208 includes a processor 302, such as a microprocessor, chipsets, field programmable gate array logic, or the like, that controls the major functions of the water purification unit 106, such as, for example, operation of the solenoid valves, operation of the filters (pre and/or main), and operation of the power source, which will be described further below. Processor 302 also processes various inputs and/or data that may be required to operate the water purification unit 106. Controller 208 also includes a memory 304 that is interconnected with processor 302. The memory 304 stores processing instructions to be executed by processor 302. The memory 304 also may store data necessary or convenient for operation of the water purification unit 106. Memory 304 may be any conventional media and include either or both volatile or nonvolatile memory. Controller 208, optionally, may be preprogrammed so as not to require a user interface 306, but typically controller 208 includes user interface 306 that is interconnected with processor 302. Such user interface 306 could include speakers, microphones, visual display screens, physical input devices such as a keyboard, mouse or touch screen, track wheels, or special input buttons to allow a user to interact with controller 208.

While only shown as a single controller 208, water purification system 106 may have one or more controllers 208. For example a single controller 208 may operate to control the filter operation, the power source, and the pump(s). Alternatively, multiple controllers 208 may be provided for individual or other combinations of parts. If, for example, irradiation is a purification technology incorporated into the above, a separate controller may be provided to charge the irradiation source, such as ultraviolet light sources. Additionally, if agents are added to the main filter, such as, for example, chlorine, a separate controller may be provided to operate a charging or injection pump.

Figure 4:
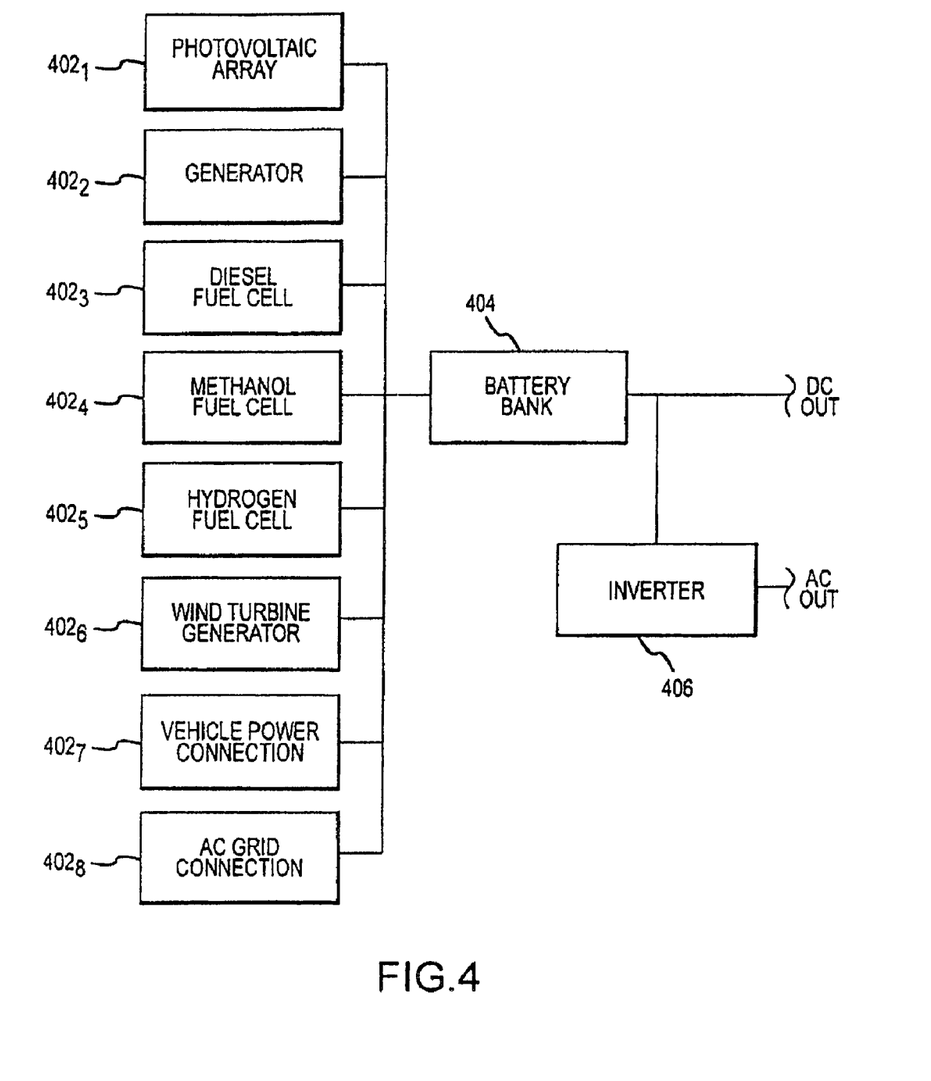
FIG. 4 is a functional block diagram of the power system of FIG. 2.

Referring now to FIG. 4, power system 202 will be described in more detail. To provide a remote, portable, or combination thereof water purification unit 106, it is beneficial to provide power system 202 such that connection to a power grid is not required. Of course, power system 202 can be designed to allow connection to a power grid. Power system 202 as shown includes may include one or more power sources $402_{1-n}$. Power source(s) $402_{1-n}$ are electrically coupled to battery bank 404 such that power source(s) 402 can be used to charge battery bank 404. Battery bank 404 would supply power to water purification unit 106, such as the controllers, solenoids, etc. Battery bank 404 conventional outputs Direct Current. If components of water purification unit 106 require Alternating Current, an inventor 406 may be provided as required. Alternatively, power source(s) 402 could directly provide power to water purification unit 106 with the battery bank 404 providing power as required or as a supplement to the power source 402.

Battery bank 404 may comprise one or more direct current batteries. Ideally, battery bank 404 should be of a sufficient ampere-hours to run water purification unit 106 when power source 402 is unavailable. One working embodiment of the technology of the present invention provides three 200 ampere-hour batteries.

Power source 402 includes at least one, and potentially several, non-grid power sources. Power source 402 also may include a grid power source as a matter of design choice for those instances when grid power is available and desirable. Power source 402 includes, for example, a photovoltaic array (i.e., solar panels) $402_1$, an air or liquid-cooled generator $402_2$ (such as a gas powered generator), a diesel fuel cell $402_3$, a methanol fuel cell $402_4$, a hydrogen fuel cell $402_5$, a wind turbine generator $402_6$, a connection to a vehicle power source $402_7$ (such as through a lighter connection in a car or truck), a connection to an AC power grid $402_8$, and the like. The power sources $402_{1-n}$ may be cycled to charge the battery bank 404 or always on for assisted trickle charging. For example, photovoltaic array $402_1$ may be selectively coupled to recharge battery bank 404 when sunlight or the like is available. Alternatively, photovoltaic array $402_1$ may be always on to provide a trickle charge or be the primary power source. Any power sources $402_{1-n}$ that produce AC power, such as, for example, power grid $402_7$, may be connected to battery bank 404 through a battery charger (not specifically shown but generally understood in the art) that converts AC power to DC power, the required input for battery bank 404. For remote and underdeveloped areas, renewable sources of power, such as, for example, photovoltaic array $402_1$ and wind turbine $402_6$ may be preferable as providing fuel, such as diesel fuel for a diesel generator $402_2$, may be difficult due to lack of infrastructure. Power source 402 also may be the primary power source for water purification system 100 with the battery bank 404 providing supplemental energy as power source 402 is unavailable or reduced availability. When power source 402 is the primary power source, charging of battery bank 404 would occur after discharge or overtime to maintain charge on battery bank 404.

Figure 5:
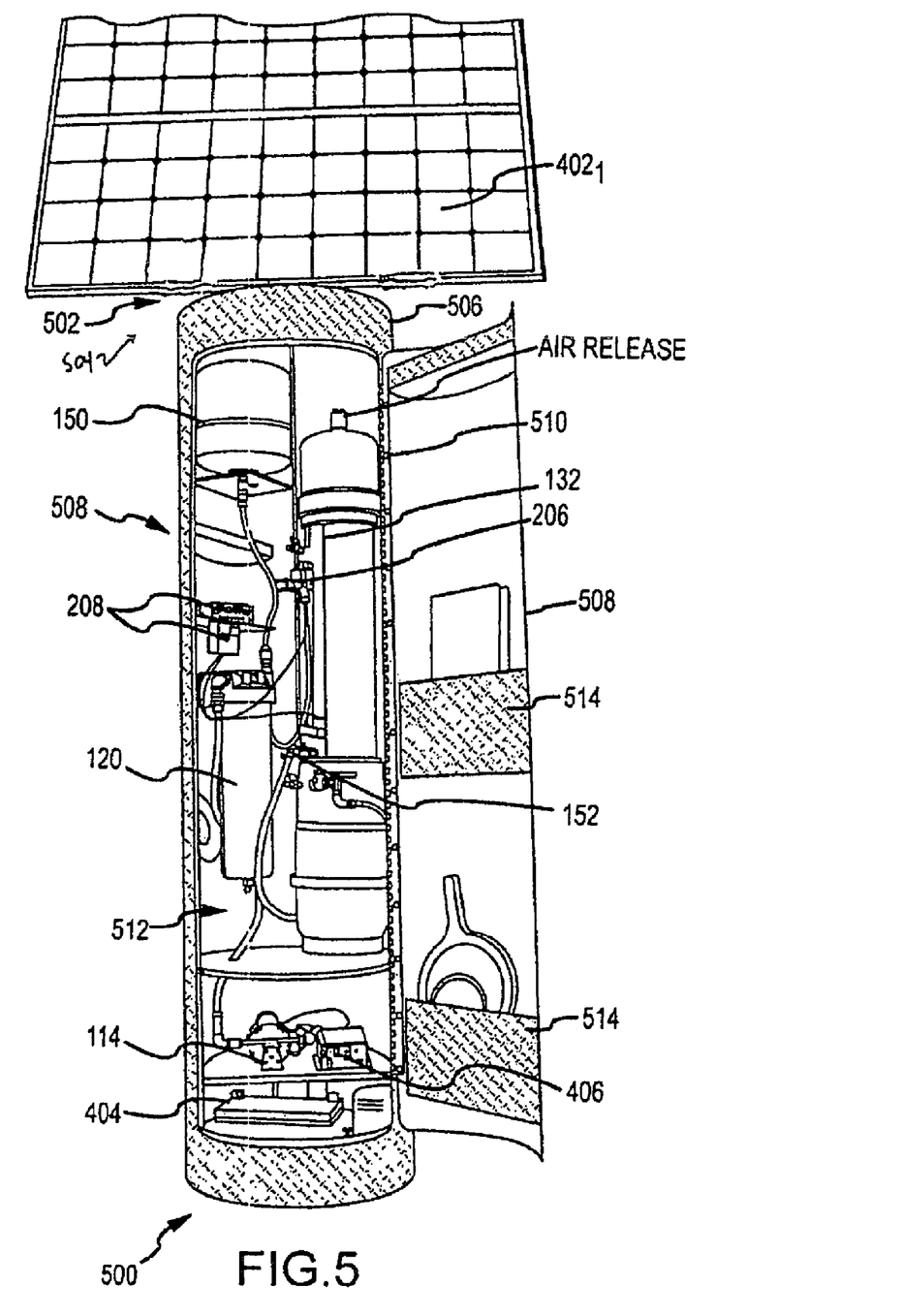
FIG. 5 is a functional block diagram of the water purification system of FIG. 1.

To inhibit tampering, increase portability, and provide a self contained water purification system 100, FIG. 5 shows housing water purification unit 106 in a housing 500. In this case, the power system 202 of water purification unit 106 comprises battery bank 404 coupled to photovoltaic array $402_1$. Electrical connection between battery bank 404 and photovoltaic array $402_1$ may be provided by a conventional wiring harness or the like. Photovoltaic array $402_1$ is mounted to housing 500 using a mount 502, which is shown as a single mount in a cylindrical shape. Mount 502 is rotationally coupled to housing 500 to allow rotating photovoltaic array $402_1$ such that it may be directed toward sun light. Alternatively, a top portion 504 of housing 500 may be rotationally coupled to a remainder 506 of housing 500 to allow rotation of photovoltaic array $402_1$. Housing 500 also has a panel 508 connected to housing 500 via a pivotal connection 510, such as one or more hinges. Panel 508 opens (as shown) and closes to allow and restrict access to the interior 512 of housing 500. In the closed position, panel 508 may be lockable. To facilitate portability and shipping, housing 500 may be made of durable, wear resistant, and light material. In one working embodiment, housing 500 was counteracted of diamond plate aluminum. Other materials are of course possible. If portability and weight are not a concern, housing 500 may be made of any durable material, such as, for example, concrete, steel, composites, or the like. Also, housing 500, depending on the arrangement of the individual parts may be designed more horizontal than vertical as shown. In a horizontal design, water purification unit 106 may be mounted in, for example, the flat bed of a truck. Mounted in a truck would provide a portable unit useful in situations, such as, for example, emergency response and the like. When mounted in a truck, the power source in most instances would be vehicle connection $402_7$. Thus, photovoltaic array $402_1$ and mount 502 may be removed. For conveniently storing tools and manuals, panel 508 may be provided with compartments 514.

Figure 6:
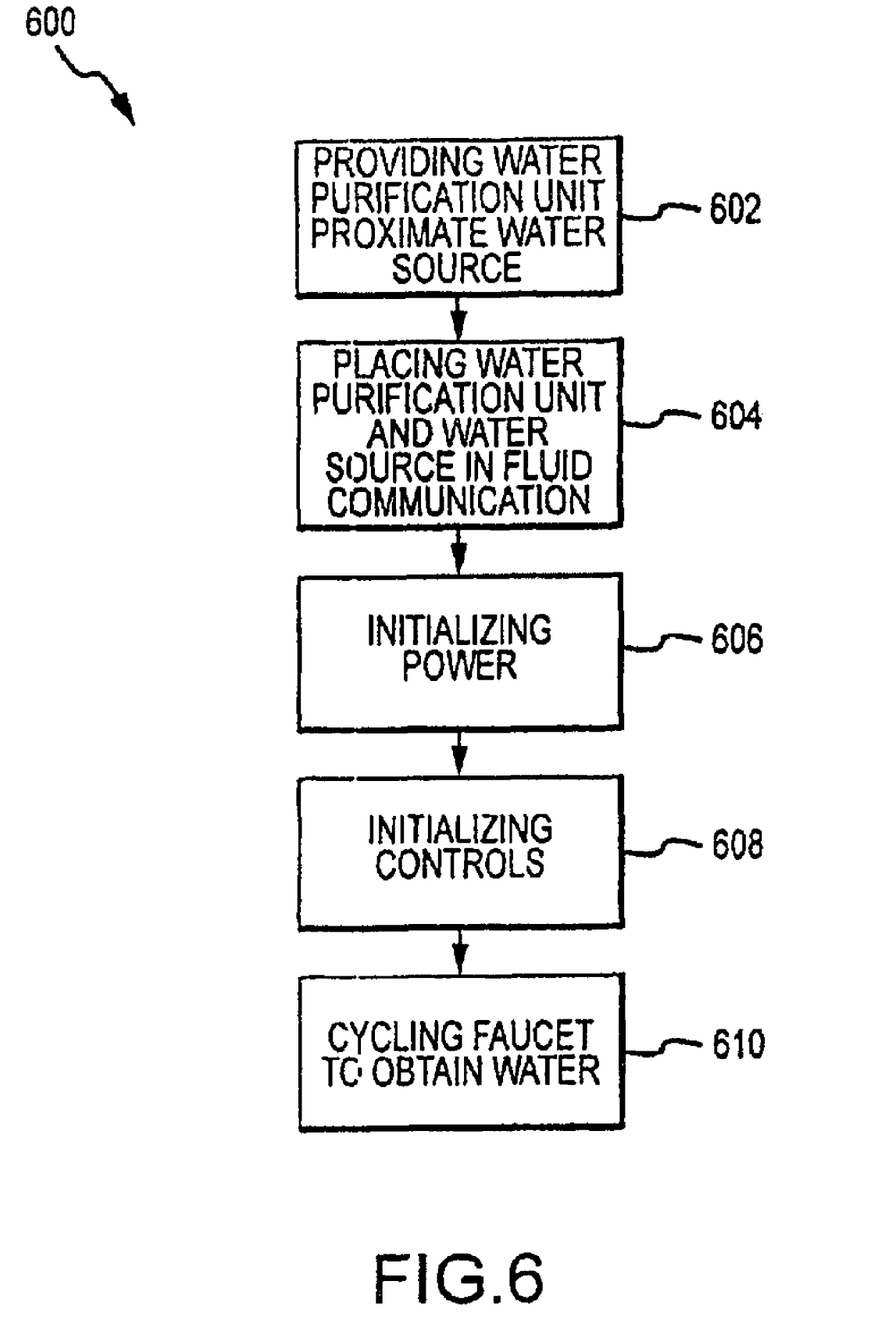
FIG. 6 is a flow chart illustrative of operational steps associated with the water purification system of FIG. 1.

A flow chart 600 provides one exemplary methodology of operating the water purification system 100. In operation, water purification unit 106 is provided in proximate of a water source 102, step 602. Water purification unit is placed in fluid communication with water source 102, step 604. Next power system 202 is initiated, step 606. Controller 208 for water purification unit 106 begins an initiation sequence, step 608. While dependent on the type of prefilter and main filter, initiation sequences may include initial fills and flushes to initiate the water purification unit. After the unit is initialized, clean, healthy drinking water is obtained by cycling faucet 138, step 610.

The previous description of the disclosed embodiments is provided to enable any person skilled in the art to make or use the technology of the present application. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A water purification unit comprising:
   a fluid inlet adapted to be in fluid communication with a water source;
   a fluid pump in fluid communication with the fluid inlet, the fluid pump adapted to draw water from the water source to the water purification unit;
   a main filter in fluid communication with the fluid inlet and the fluid pump, the main filter comprising a series of filters adapted to filtrate the water from the water source;
   an expansion tank in fluid communication with the fluid inlet, the fluid pump, and the main filter;
   a water purification unit outlet in fluid communication with the fluid inlet, the fluid pump, and the main filter, the water purification unit outlet adapted to provide filtered water;
   a controller, the controller electrically coupled to the fluid pump;
   a pressure sensor that senses the pressure of the expansion tank and transmits a pressure signal to the controller;
   a power system to provide electrical energy to the water purification unit; the power system comprising:
      a non-grid power source electrically coupled to the controller and the fluid pump; and
      a cylindrical housing defining an interior space to house the fluid pump, the main filter, and the controller;
   wherein the fluid pump cycles on when the pressure in the expansion tank decreases below a first threshold and cycles off when the pressure in the expansion tank increases above a second threshold.

2. The water purification unit of claim 1, wherein the non-grid power source comprises at least one non-grid power source selected from the group of non-grid power sources consisting of: a photovoltaic array, a generator, a diesel fuel cell, a methanol fuel cell, a hydrogen fuel cell, a wind turbine generator, or a vehicle power connection.

3. The water purification unit of claim 1 wherein the power system further comprises a battery electrically coupled to the water purification unit.

4. The water purification unit of claim 3, wherein the power system further comprises a grid connection adapted to be electrically coupled to the battery.

5. The water purification unit of claim 1, wherein the non-grid power source is a photovoltaic array rotatably coupled to an exterior of the housing.

6. The water purification unit of claim 1, wherein the photovoltaic array is pivotally coupled to the exterior of the housing such that the photovoltaic array may be pivoted relative the housing.

7. The water purification unit of claim 1, wherein the series of filters comprises a plurality of membranes.

8. The water purification unit of claim 1, wherein the series of filters comprises at least a first filter type and at least a second filter type wherein the first filter type and the second filter type are different.

9. The water purification unit of claim 8, wherein the first filter type comprises a carbon filter.

10. The water purification unit of claim 9, wherein the second filter is selected from a group of filters consisting of: a membrane filter, a reverse osmosis filter, an ionic filter, a radiation filter, or an agent additive filter.

11. The water purification unit of claim 1, further comprising an add pump in fluid communication with the main filter and an agent source wherein an agent pumpable into the main filter.

12. The water purification unit of claim 11, wherein the add pump is an injection pump.

13. The water purification unit of claim 11 wherein the add pump is a charge pump.

14. A water purification system comprising:
   a water source;
   an inlet pipe;
   a cylindrical housing; and
   a water purification unit contained in the cylindrical housing, the water purification unit comprising:
      a fluid inlet coupled to the inlet pipe and in fluid communication with the water source;
      a fluid pump in fluid communication with the fluid inlet, the fluid pump adapted to draw water from the water source to the water purification unit;
      means for filtering coarse particulate in fluid communication with the fluid pump and the fluid inlet, the means for filtering coarse particulate adapted to filtrate the water from the water source;
      means for filtering fine particulate in fluid communication with the fluid pump and the fluid inlet, the means for filtering fine particulate adapted to filtrate the water from the water source;
      a filter bypass line in fluid communication with the fluid inlet, the fluid pump, and the means for filtering fine particulate, wherein the filter bypass bypasses the a portion of the water purification system and the bypass line adapted to transport fluid from the fluid inlet;
      a pair of filter isolation valves, the pair of filter isolation valves adapted to divert fluid to the filter bypass line;
      an expansion tank in fluid communication with the fluid inlet and the fluid pump;
      an outlet isolation valve in fluid communication with the fluid inlet, the outlet isolation valve adapted to provide filtered water when opened;
      a controller electrically coupled to at least the fluid pump;
      a battery electrically coupled to the water purification unit; and
      a photovoltaic array coupled to the battery and the water purification unit such that the battery and photovoltaic array provide electrical power to the water purification unit;
      wherein the fluid pump cycles on when the outlet isolation valve is opened and the fluid pump cycles off when the outlet isolation valve is closed.

15. The water purification system of claim 14, wherein the housing is formed from diamond plate aluminum.

16. The water purification system of claim 14, wherein the photovoltaic array is mounted to an exterior of the housing and rotatable.

17. A water purification unit, comprising:
   a fluid inlet adapted to be in fluid communication with a water source;
   means for drawing fluid from the water source through the water purification unit;
   first means for purifying the water from the water source;
   second means for purifying the water from the water source, wherein the first means and the second means comprise a series of membranes;
   an expansion tank in fluid communication with the fluid inlet, the fluid pump, the first means for purifying the water, and the second for purifying the water;
   means for dispensing purified water from the water purification unit; and
   non-grid means for providing electrical power to the water purification unit;

wherein the means for drawing fluid cycles on when the means for dispensing purified water is opened and the means for drawing fluid cycles off when the means for dispensing purified water is closed.

18. The water purification unit of claim 17, wherein the non-grid means for providing electrical power is a renewable energy source.

19. The water purification unit of claim 17, further comprising a third means for purifying the water wherein the third means is provided upstream of the first means and the second means and is different than the first means and the second means.

* * * * *